United States Patent
Valdes Colina

(10) Patent No.: US 9,525,277 B2
(45) Date of Patent: Dec. 20, 2016

(54) SECTION OF CABLE TRAY

(75) Inventor: Justo Manuel Valdes Colina, Meruelo (ES)

(73) Assignee: VALDINOX, S.L., Meruelo (ES)

( * ) Notice: Subject to any disclaimer, the term of this patent is extended or adjusted under 35 U.S.C. 154(b) by 0 days.

(21) Appl. No.: 14/232,870

(22) PCT Filed: Jul. 11, 2012

(86) PCT No.: PCT/ES2012/070517
§ 371 (c)(1),
(2), (4) Date: Jan. 14, 2014

(87) PCT Pub. No.: WO2013/007855
PCT Pub. Date: Jan. 17, 2013

(65) Prior Publication Data
US 2014/0151513 A1 Jun. 5, 2014

(30) Foreign Application Priority Data
Jul. 14, 2011 (ES) .................. P201100806

(51) Int. Cl.
*F16L 3/00* (2006.01)
*H02G 3/04* (2006.01)
*H02G 3/06* (2006.01)
*F16B 7/22* (2006.01)

(52) U.S. Cl.
CPC .......... *H02G 3/0443* (2013.01); *H02G 3/0608* (2013.01); *F16B 7/22* (2013.01)

(58) Field of Classification Search
CPC ........................... H02G 3/0443; H02G 3/0608
USPC .... 248/49, 68.1, 58; 403/329, 326; 174/503, 174/480, 135
See application file for complete search history.

(56) References Cited

U.S. PATENT DOCUMENTS

| 6,193,434 | B1 * | 2/2001 | Durin et al. .................. 403/329 |
| 6,239,364 | B1 | 5/2001 | Nickel |
| 7,546,987 | B2 * | 6/2009 | Sinkoff ................ H02G 3/0443 248/68.1 |
| 2005/0040295 | A1 * | 2/2005 | Sinkoff .......................... 248/58 |
| 2009/0008516 | A1 * | 1/2009 | Davis et al. ................. 248/74.1 |

FOREIGN PATENT DOCUMENTS

| DE | 2358863 A1 * | 11/1973 |
| EP | 0571307 | 11/1993 |
| EP | 0822364 | 2/1998 |

(Continued)

*Primary Examiner* — Kimberly Wood
(74) *Attorney, Agent, or Firm* — Blakely Sokoloff Taylor & Zafman LLP

(57) ABSTRACT

The invention relates to a section of cable tray, which can be connected to other sections without using additional accessories, allowing the connection of anchoring elements located at one end of the walls of each tray section. The aforementioned anchoring elements take the form of rods bent to form a V-shape that extends into straight extensions which are installed between longitudinal rods. In addition, turns are provided in the aforementioned rods between the straight zones and the V-shape, one turn towards the interior of the tray and another turn towards the exterior. Sections are coupled by sliding the sides of the first transverse rod of the tray section to be joined through the V-shape, such that they remain trapped between the inner turns and the sides of the last transverse rod of the receiving tray section.

17 Claims, 3 Drawing Sheets

(56) References Cited

FOREIGN PATENT DOCUMENTS

Figure 1:
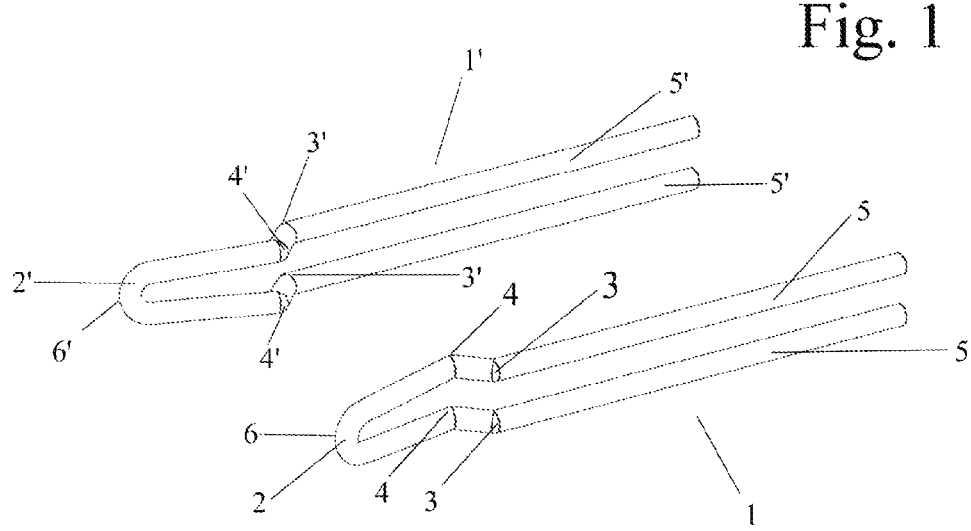

| | | | | |
|---|---|---|---|---|
| EP | 1039198 | | 9/2000 | |
| EP | 1501163 A1 | * | 1/2005 | ........... H02G 3/0443 |
| EP | 1750338 A1 | * | 2/2007 | |
| ES | 2279589 | | 8/2007 | |
| ES | 2355992 | | 4/2011 | |
| FR | 2613146 A | * | 9/1988 | |
| FR | 2812774 A1 | * | 2/2002 | ........... H02G 3/0443 |
| FR | 2821992 A1 | * | 9/2002 | |
| FR | 2825528 A1 | * | 12/2002 | |
| FR | 2853464 A1 | * | 10/2004 | ........... H02G 3/0443 |
| FR | 2858127 A1 | * | 1/2005 | |
| FR | 2966987 A1 | * | 5/2012 | ........... H02G 3/0443 |
| WO | WO 2009121976 A1 | * | 10/2009 | |

* cited by examiner

SECTION OF CABLE TRAY

FIELD OF THE INVENTION

The invention refers to a tray which serves to guide and hold electrical or similar wires. It is applicable to wire mesh trays with a plurality of sections, where each section is made up of longitudinal metal wires that are welded to transversal metal wires in a "U" shape, they are laid out at regular intervals, thereby defining a channel with a base and two side walls.

The tray is created by coupling the successive sections that are manufactured with a specific length; it is the worker who couples them to form the conduct to hold the wires.

The invention concerns coupleable tray sections which can be coupled with each other with no need for additional accessories and no tools required for the coupling.

BACKGROUND TO THE INVENTION

Different models of joining are known to make up this kind of wire mesh trays. The anchorage systems for the successive tray sections using clamps that are installed between every two sections to hold the transversal metal wires together with lugs are well-known. Other systems hold down the base and the walls of two adjacent tray sections by jointly holding the last transversal metal wire with a splint, a screw and the complementary nut. These systems in which devices or accessories that have to be installed by the worker are used require exactness in the assembly of the tray, usually done at the place of installation with the worker standing on a ladder or in an uncomfortable position.

Bearing these problems in mind anchorage systems have been designed for tray sections without additional devices or accessories, with sections that couple with each other. Spanish patent 2279589 is well-known, in which the tray sections have different ends, one of which is narrowed in height and width in comparison to the other, and the larger end has at least two transversal metal wires that are very close to each other, to insert the transversal metal wire of the smaller end between these metal wires in the section of the next tray. The disadvantage of this tray is the work required to make all the folds in the smaller end.

Spanish patent 2355992 also has a narrowing at one of the ends of each tray section, with folds and peaks, which are linked in order to couple with other folds and peaks at the larger tray end. The union with this invention is overlapping and it requires accessories for correct holding.

European patent EP-0571307 describes a union by means of the installation of long splints on the side walls that protrude from the tray section; these splints have a flange on the inside of one of the ends, where the last but one transversal metal wire interlocks with the following tray section. This method of anchorage with the union between the flanges on each splint does not ensure a perfect holding, and so the patent suggests placing an extra device, a holding clip between the tray sections, when they are of a greater length.

DESCRIPTION OF THE INVENTION

The objective of the invention being presented is for the wire holding tray sections to be joined with no need for additional accessories, regardless of the length of the tray section, with easy assembly and simple manufacturing.

This tray section is configured by means of longitudinal metal wires and other transversal wires in a "U" shape to make a channel with a base and two side walls.

In order to achieve the objectives of the invention, each tray section will have at least one anchorage element.

This anchorage element is made of a metal wire bent into two parts, thereby making a "V" shape which is prolonged in parallel straight lines.

The anchorage element is installed on the outer side of the walls of the tray section, between the longitudinal metal wires, welded along the straight sections to the last but one and last transversal metal wires; the straight section protrudes slightly from the last transversal metal wire, then there is an internal bend towards the inside of the tray, and another bend towards the outside, ending in the "V" shape. With this design, there is a gap between the last transversal metal wire and the internal bend.

The union is produced when the first transversal metal wire in the tray section to be joined is placed between the two anchorage elements on the walls of the complementary tray section. The holding is quick and firm, with no looseness in the coupling, as the first transversal metal wire of the section to join is trapped between the internal bends and the last transversal metal wire on the receptor tray section and cannot move at all.

The tray section proposed by the invention has no protrusions or edges that could cut the worker.

To complement this description and in order to provide a greater understanding of the characteristics of this invention, this descriptive report is annexed by technical drawings to illustrate the recommended modus operandi, as follows:

FIG. 1—View of the anchorage elements on the tray section.

Figure 2:
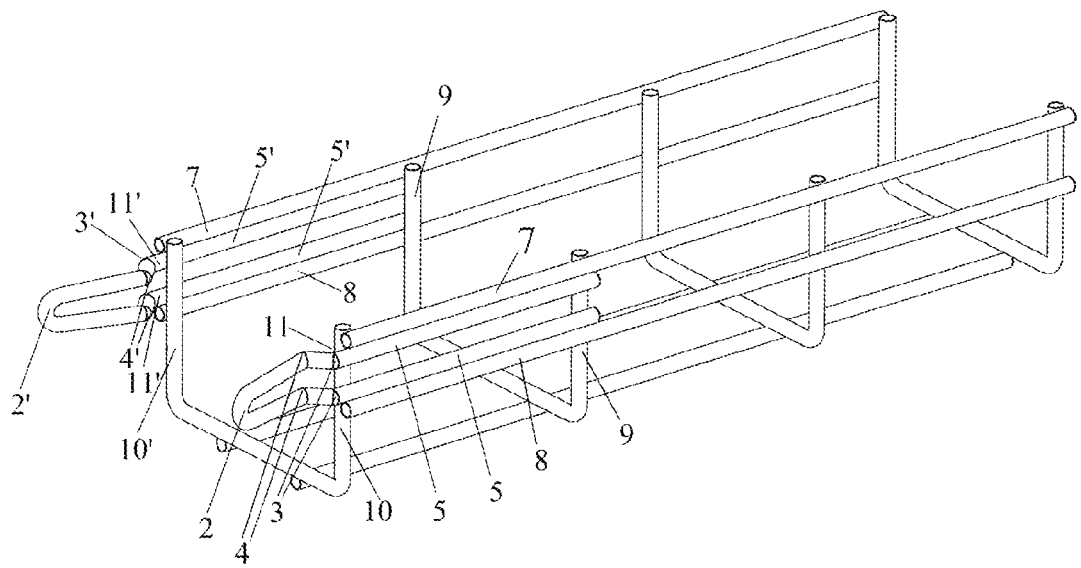

FIG. 2—View of a tray section with the anchorage elements.

Figure 3:
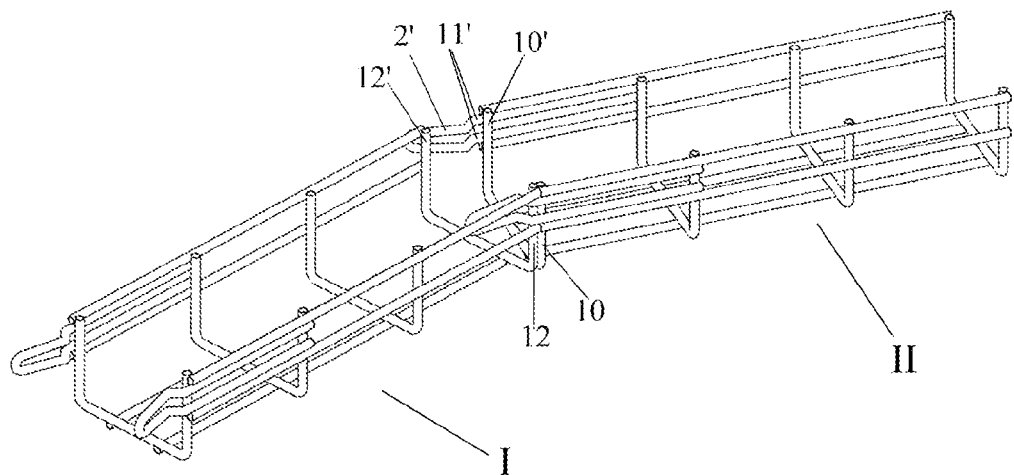

FIG. 3—View of two tray sections in the process of joining.

Figure 4:
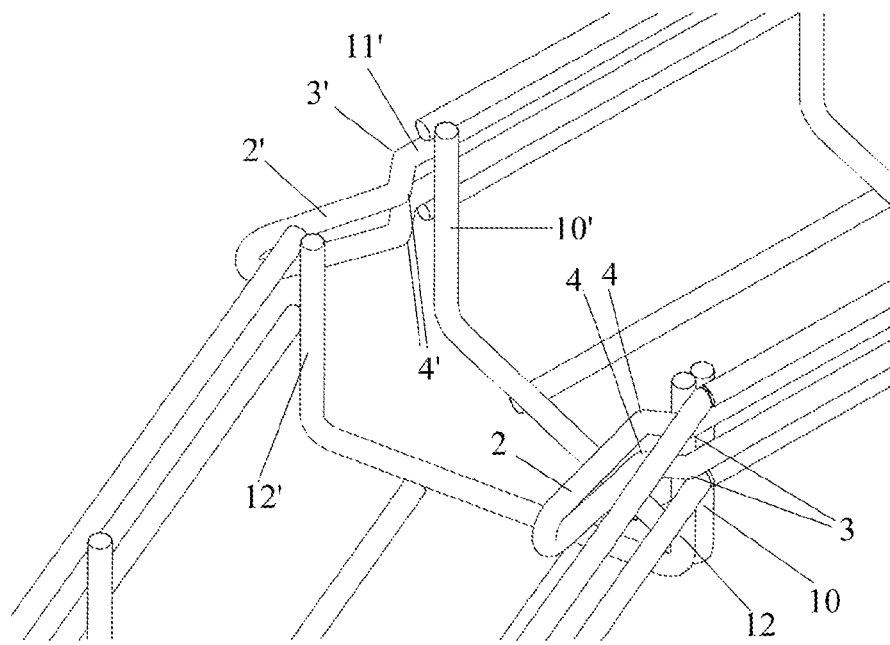

FIG. 4—Detail of the placing of the two tray sections for their joining.

Figure 5:
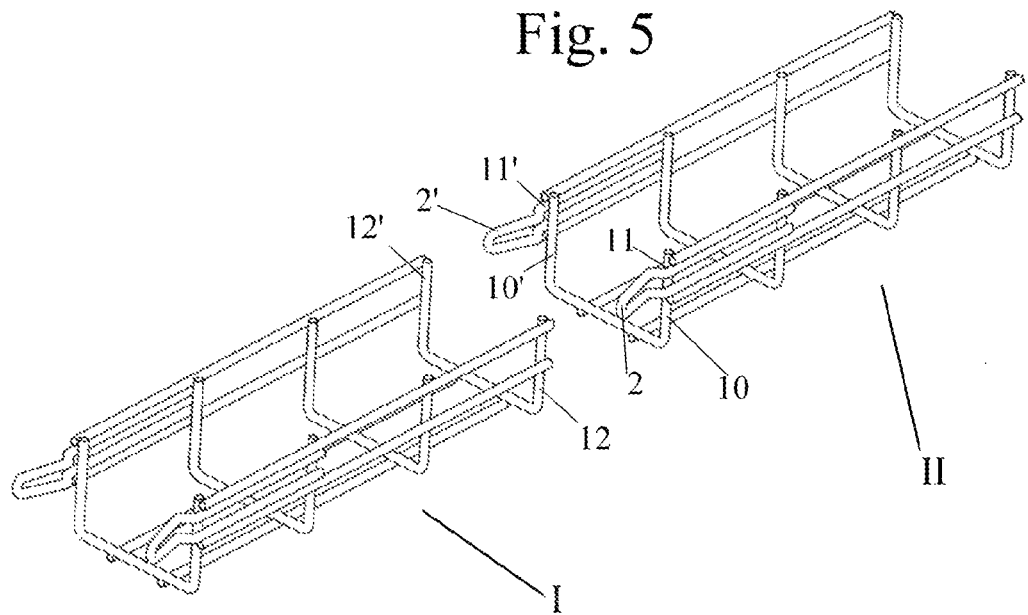

FIG. 5—View of two adjacent tray sections to be joined by means of another coupling method.

Figure 6:
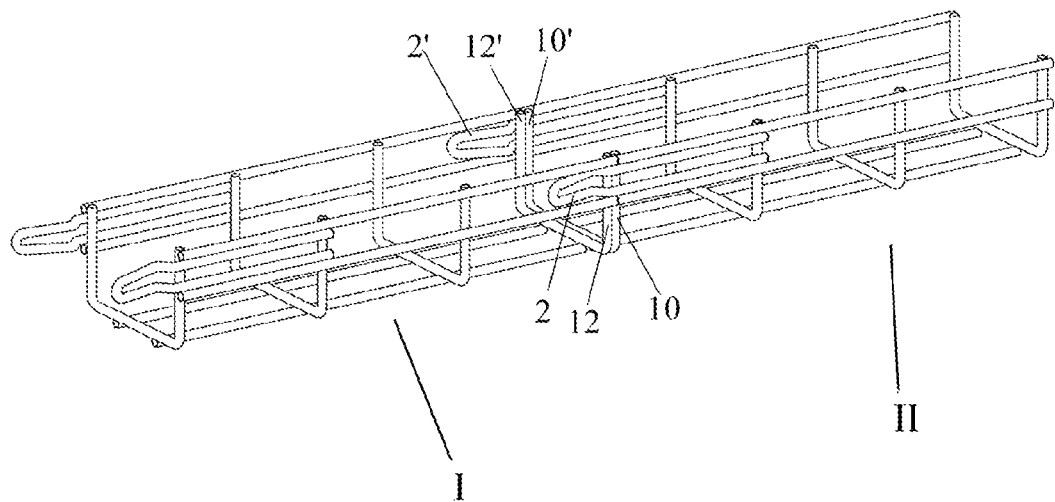

FIG. 6—View of the two tray sections joined together.

PREFERRED EXECUTION OF THE INVENTION

In FIG. 1 the anchorage elements are shown (1, 1'), created by means of metal wires bent in such a way that one of the ends has a "V" shape (2, 2'), which is followed by bends (4, 4') and (3, 3'), followed by parallel straight sections (5, 5').

Once that the anchorage elements have been described (1, 1'), starting in the straight sections (5, 5'), we can see that after these straight sections (5, 5') there is a bend facing the inside of the tray at an angle of 45° in regard to the longitudinal plane, an internal bend (3, 3'), followed by a bend towards the outside of the tray at an angle of 15° in regard to the same plane, an external bend (4, 4'), which is followed by the "V" shape (2, 2').

The vertex of the "V" shape bend (2, 2') is flattened (6, 6'), and the "V" shape has an extension and angle suitable for being placed between two longitudinal metal wires on the tray section walls.

This anchorage element (1, 1') is placed on the outer part of the walls of one end of the tray section, between the longitudinal metal wires (7, 8), placing an anchorage element (1, 1') on each wall of the tray section (FIG. 2). It is fixed by welding it to the last but one transversal metal wire (9), at the end of the straight sections (5, 5'), and before the bend (3, 3') the anchorage element (1, 1') is fixed to the last transversal metal wire (10, 10').

The straight sections (5, 5') on the anchorage element (1, 1') are long enough to be installed in the last but one transversal metal wire (9), slightly protruding the last transversal metal wire (10), in order to leave a gap (11, 11') between the side of the last transversal metal wire (10, 10') and the bend (3, 3') on the anchorage element (1, 1'). The length of this gap (11, 11') is related to the thickness of one of the transversal metal wires in the tray section.

The union of the tray sections (I, II), the section to join (I) and the receptor section (II), is achieved by placing one side of the first transversal metal wire (12) on the section to join (I) in the gap (11) between the side of the last transversal metal wire (10) and the bend (3) in the receptor tray section (II). It should slide down the "V" form (2) until it falls directly into the gap (11) in order to achieve the joining. In this position the other side of the first transversal metal wire (12') of the section to join (II) has necessarily been placed in contact with the "V" shape (2') on the anchorage element (1'). The worker will have to press the tray section to join (I), holding the receptor section (II) so that the side of the first transversal metal wire (12') slides down the "V" (2') and falls into the gap (11').

Another joining method permitted by the invention is the adjacent placing (FIG. 5) of the two tray sections, pressing simultaneously on the two sides of the first transversal metal wire (12, 12') of the section to join (I) and on the "V" shapes (2, 2') of the receptor section (II), so that these sides join together (12, 12'), at the same time, in the gaps (11, 11') of the receptor section (II).

The final situation of the coupling process, regardless of the method of union employed, is shown in FIG. 6.

REFERENCE SIGNS

I.—Tray section to join
II.—Receptor tray section
1, 1'.—Anchorage element
2, 2'.—"V" shape
3, 3'.—Internal bend
4, 4'.—External bend
5, 5'.—Straight sections
6, 6'.—Vertex
7, 8.—Longitudinal metal wires
9.—Last but one transversal metal wire
10, 10'.—Sides of the last transversal metal wire
11, 11'.—Gap
12, 12'.—Sides of the first transversal metal wire

The invention claimed is:

1. A first cable tray, comprising:
multiple longitudinal wires;
multiple transverse wires that are substantially in a shape of a "U", wherein the longitudinal wires and the transverse wires are coupled together to form the first cable tray and to provide the first cable tray with a channel having a base, a first side wall, and a second side wall, and wherein the first cable tray has a first end and a second end; and
a wire anchorage element that extends from the first cable tray, from a first transverse wire at the first end and at the first side wall of the first cable tray, wherein the anchorage element comprises a first bend that extends a first portion of the anchorage element in a first direction, wherein the anchorage element further comprises a second bend that is disposed between the first bend and a V-shaped terminal end of the anchorage element and that extends a portion of the V-shaped terminal end of the anchorage element in a second direction that is different to the first direction, wherein the anchorage element defines a gap that is disposed directly between the first bend and the first transverse wire, wherein the gap is configured to selectively capture a second transverse wire at a second terminal end of a second cable tray, and wherein the gap has a length related to a thickness of the second transverse wire, the length of the gap being slightly larger than the thickness of the second transverse wire.

2. The first cable tray of claim 1, wherein the first side wall comprises a top terminal end and a bottom end, wherein the bottom end is contiguous with the base, and wherein no portion of the anchorage element extends above the top terminal end of the first side wall.

3. The first cable tray of claim 1, wherein the anchorage element is configured to selectively hold a length of the second transverse wire at the second terminal end of the second cable tray in the gap and in contact with a length of the first transverse wire along a portion of the first side wall, a portion of the base, and a portion of the second side wall of the first cable tray.

4. The first cable tray of claim 1, wherein the first direction is towards a longitudinal axis that extends through a length of the first cable tray and past the first and second ends of the first cable tray.

5. The first cable tray of claim 4, wherein the second direction extends laterally at an angle away from the longitudinal axis.

6. A first cable tray, comprising:
multiple longitudinal wires;
multiple transverse wires that are substantially in a shape of a "U", wherein the longitudinal wires and the transverse wires are coupled together to form the first cable tray and to provide the first cable tray with a channel having a base, a first side wall, and a second side wall, and wherein the first cable tray has a first end and a second end;
a first wire anchorage element that extends from a first transverse wire at the first end and at the first side wall of the first cable tray; and
a second wire anchorage element that extends from the first transverse wire at the first end and at the second side wall of the first cable tray,
wherein the first and second anchorage elements each comprise a corresponding first bend that extends a portion of each of the first and second anchorage elements in a first direction, wherein the first and second anchorage elements each further comprise a corresponding second bend that is disposed between the corresponding first bend and a corresponding V-shaped terminal end of each of the first and second anchorage elements and that extends a portion of each of the corresponding V-shaped terminal ends of the first and second anchorage elements in a second direction that is different than the first direction, wherein the first and second anchorage elements each define a corresponding gap disposed directly between their corresponding first bend and the first transverse wire, wherein the corresponding gap of the first and second anchorage elements are each configured to selectively capture a second transverse wire at a second terminal end of a second cable tray between the corresponding first bend of each of the first and second anchorage elements and the first transverse wire, and wherein the corresponding gap of the first and second anchorage elements have each a length related to a thickness of the second transverse wire, the length of the corresponding gap of the first and second anchorage elements being slightly larger than the thickness of the second transverse wire.

7. The first cable tray of claim 6, wherein the first and second anchorage elements are configured to capture the second transverse wire such that the second transverse wire of the second cable tray is selectively and releasably captured between the first and second anchorage elements.

8. The first cable tray of claim 6, wherein the first side wall of the first cable tray comprises a top terminal end and a bottom end, wherein the bottom end is contiguous with the base, and wherein no portion of the anchorage element extends above the top terminal end of the first side wall of the first cable tray.

9. The first cable tray of claim 6, wherein the first and second anchorage elements are configured to selectively hold a length of the second transverse wire at the second, terminal end of the second cable tray in the corresponding gap of the first and second anchorage elements and in contact with a length of the first transverse wire along a portion of the first side wall, a portion of the base, and a portion of the second side wall of the first cable tray.

10. The first cable tray of claim 6, wherein the first direction is towards a longitudinal axis that extends through a length of the first cable tray and past the first and second ends of the first cable tray.

11. The first cable tray of claim 6, wherein the second direction extends at an angle away from the longitudinal axis.

12. A cable tray system, comprising:
a first cable tray section and a second cable tray section that each comprise:
multiple longitudinal wires;
multiple transverse wires that are substantially in a shape of a "U",
wherein the longitudinal wires and the transverse wires are coupled together to form the first and second cable tray sections and to provide each of the first and second cable tray sections with a corresponding channel having a corresponding base, first side wall, and second side wall, and wherein each of the first and second cable tray sections has a corresponding first end and a second end;
a first wire anchorage element that extends from a corresponding first transverse wire at the first end and at the first side wall of each of the first and second cable tray sections; and
a second wire anchorage element that extends from the corresponding first transverse wire at the first end and at the second side wall of each of the first and second cable tray sections,
wherein the first and second anchorage elements on the first and second cable tray sections each comprise a corresponding first bend that extends a portion of each of the first and second anchorage elements in a first direction, wherein the first and second anchorage elements each further comprise a corresponding second bend that is disposed between the corresponding first bend and a corresponding V-shaped terminal end of each of the first and second anchorage elements and that extends a portion of each of the corresponding V-shaped terminal ends of the first and second anchorage elements in a second direction that is different than the first direction, wherein the first and second anchorage elements each define a corresponding gap disposed directly between the corresponding first bend and the corresponding first transverse wire, and wherein the corresponding gap of the first and second anchorage elements are each configured to selectively capture a second transverse wire at a second terminal end of another cable tray section between the corresponding first bend of each of the first and second anchorage elements and the corresponding first transverse wire, wherein the second transverse wire at the second terminal end of the second cable tray section is selectively and releasably captured within the corresponding gap of the first and second anchorage elements of the first cable tray section, and wherein the corresponding gap of the first and second anchorage elements have each a length related to a thickness of the second transverse wire, the length of the corresponding gap of the first and second anchorage elements being slightly larger than the thickness of the second transverse wire.

13. The system of claim 12, wherein the first and second anchorage elements of the first cable tray section capture the second, terminal transverse wire of the second cable tray section between the first and second anchorage elements of the first cable tray section.

14. The system of claim 12, wherein the first side wall of the first cable tray section comprises a top terminal end and a bottom end, wherein the bottom end is contiguous with the corresponding base of the first cable tray section, and wherein no portion of the first anchorage element of the first cable tray section extends above the top terminal end of the first side wall of the first cable tray section.

15. The system of claim 12, wherein the first anchorage element of the first cable tray section is configured to selectively hold a length of the second transverse wire at the second terminal end of the second cable tray in the corresponding gap and in contact with a length of the corresponding first transverse wire along a portion of the corresponding first side wall, base, and second side wall of the first cable tray.

16. The system of claim 12, wherein the first direction is towards a longitudinal axis that extends through a length of the first cable tray section and past the first and second ends of the first cable tray section.

17. The system of claim 12, wherein the second direction extends laterally at an angle away from the longitudinal axis.

* * * * *